Figure 1:
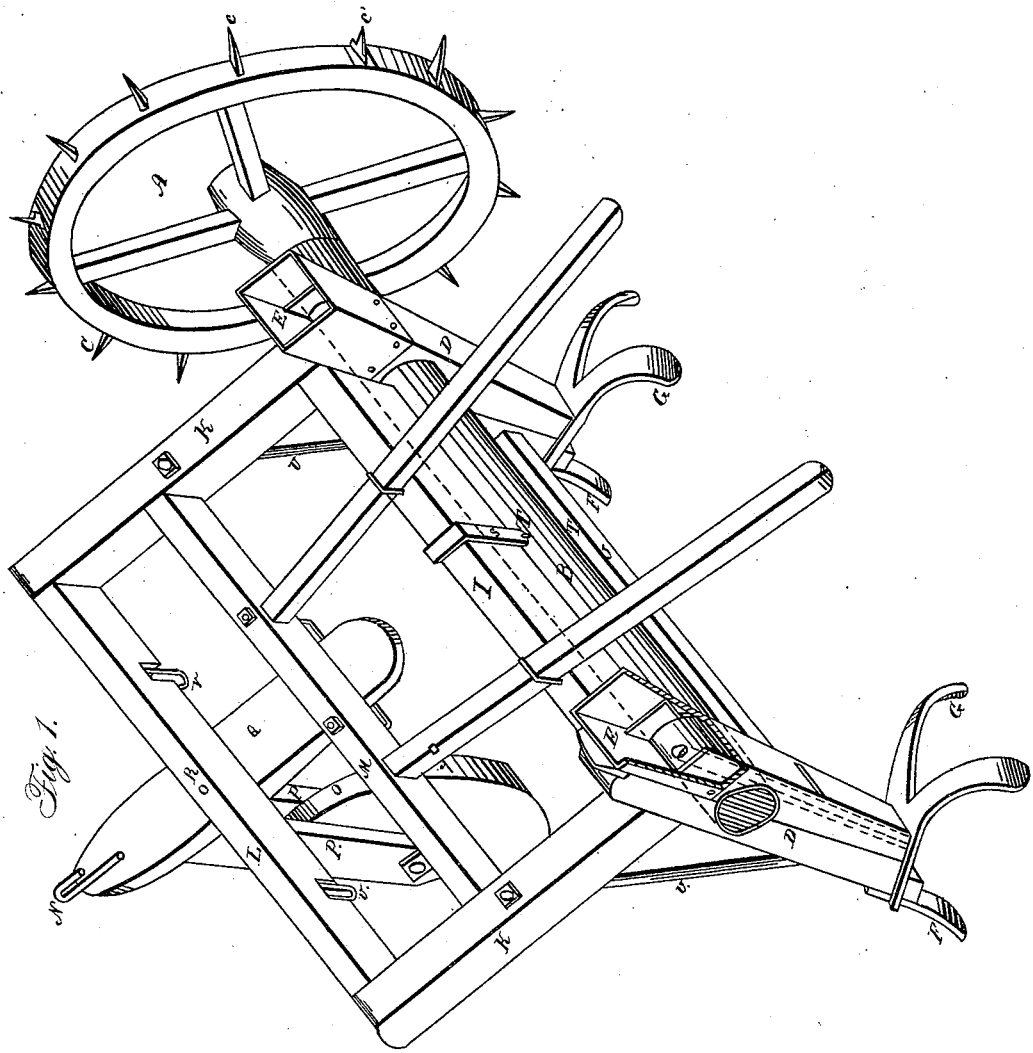

G. HETRICK.
Corn-Planter.

No. 29,078. Patented July 10. 1860.

UNITED STATES PATENT OFFICE.

GEORGE HETRICK, OF REIDSBURG, PENNSYLVANIA.

IMPROVEMENT IN SEED-PLANTERS.

Specification forming part of Letters Patent No. 29,078, dated July 10, 1860.

*To all whom it may concern:*

Be it known that I, GEORGE HETRICK, of Reidsburg, in the county of Clarion and State of Pennsylvania, have invented certain new and useful Improvements in Seed or Corn Planters; and I do hereby declare that the same are described and represented in the following specification and drawing.

To enable others skilled in the art to make and use my improvements, I will proceed to describe their construction and operation, referring to the drawing, in which the same letters indicate like parts in each of the figures.

Figure 1 is a perspective drawing of a seed-planter with my improvements. One of the parts is omitted to show the other parts more clearly.

The nature of my invention consists in the arrangement of devices described in the following specification.

In the accompanying drawing, one of the wheels is shown at A, carrying one end of the axle B, which axle is turned by the wheel A, which is provided with spikes C C' on its periphery, which penetrate the ground as the wheel is turned; and the spikes C' are made different from the others, as shown in the drawing, to mark the ground opposite where the seed is deposited. The axle B turns in the standards D D, which are fitted to it, which standards are provided with boxes E E to receive the seed to be planted, and are perforated through their whole length to conduct the seed to the ground and deposit it in the furrows made by the teeth F F, which are fastened to the standards, as shown in the drawing; and the covering-scrapers G G follow the standards and draw the earth over the seed to cover it. The journals of the axle B cross the perforations in the standards D to hold the seed in the boxes, except it is carried around and dropped by the perforations H in the journals of the axle, which perforations are provided with screws to make the seed-cells deep or shallow to graduate the quantity of seed dropped in each hill. The standards D D are connected by the bar I at the top and the bar J at the bottom, as shown in the drawing; and the side bars, K K, of the frame are fastened to the standards D D and connected by the bars L and M of the frame; and the animal which draws the frame may be hitched to the hook N by some convenient means provided for that purpose. The fore end of the frame is supported by the wheel O, which turns on a pin in the hounds P P, which hounds are fastened in a vibrating bar, Q, that swings on the pin R in the bar L; and the hook N, by which the machine is drawn, is fastened to the fore end of the bar Q to turn or vibrate the bar with the wheel O, so as to make the machine follow readily the direction in which it is drawn by the animal hitched to it. The spring S is fastened to the bar I, and is vibrated by the pins T in the axle B, so as to snap and indicate when the seed falls, so that the attendant can see if it is opposite the mark made by the marking-spike when the next rows were planted, and make hills or deposits of seed in rows each way, so that the crop grown can be cultivated both ways—that is, at right angle one to the other.

U U are braces from the bars K to the standards D.

The staples V V are for the insertion of shafts, between which the animal may be harnessed to draw the machine.

I believe I have described and represented my improvements in corn or seed planters so as to enable any person skilled in the art to make and use them.

I will now state what I desire to secure by Letters Patent, to wit:

The arrangement of the standards D D, axle B, wheels A, with spikes C C', and caster-wheel O, the whole being constructed and arranged for joint operation, substantially as described.

GEORGE HETRICK.

Witnesses:
GEORGE MEANS,
M. A. MEANS.